United States Patent

Sugimoto et al.

[11] Patent Number: 5,728,011
[45] Date of Patent: Mar. 17, 1998

[54] THREAD WOUND GOLF BALL AND PROCESS FOR PRODUCING THE SAME

[75] Inventors: Kazushige Sugimoto, Shirakawa; Hiromasa Yamamoto, Takarazuka; Tsutomu Nosaka, Hyogo-ken, all of Japan

[73] Assignee: Sumitomo Rubber Industries, Ltd., Hyogo-ken, Japan

[21] Appl. No.: 622,168

[22] Filed: Mar. 27, 1996

[30] Foreign Application Priority Data

Mar. 27, 1995 [JP] Japan ................... 7-068277

[51] Int. Cl.$^6$ .................................................. A63B 37/02
[52] U.S. Cl. ................... 473/357; 156/170; 156/437; 425/473; 473/356
[58] Field of Search ......................... 156/170, 437; 242/435.1, 435, 435.2; 425/473; 473/362, 361, 356, 357

[56] References Cited

U.S. PATENT DOCUMENTS

| | | | |
|---|---|---|---|
| 711,178 | 10/1902 | Richards | 473/361 |
| 716,349 | 12/1902 | Richards | 473/356 X |
| 737,773 | 9/1903 | Richards | 473/362 |
| 737,774 | 9/1903 | Richards | 473/366 X |
| 749,053 | 1/1904 | Grist | 473/366 |
| 2,812,542 | 11/1957 | Bleher | 425/373 X |
| 2,971,218 | 2/1961 | Bierer | 425/373 X |

FOREIGN PATENT DOCUMENTS

| | | | |
|---|---|---|---|
| 646060 | 7/1962 | Canada | 273/227 |
| 1016783 | 1/1966 | United Kingdom | 273/227 |

OTHER PUBLICATIONS

Ullmann's Encyclopedia of Industrial Chemistry, vol. A23: Refractory Ceramics to Silicon Carbide, 1993, p. 446.

*Primary Examiner*—Jeff H. Aftergut
*Attorney, Agent, or Firm*—Birch, Stewart, Kolasch & Birch,LLP

[57] ABSTRACT

Disclosed is a thread wound golf ball comprising a center, a thread rubber layer formed by winding a thread rubber around the center and a cover formed on the thread rubber layer, wherein the thread rubber is obtained by cutting, into a suitable width, a rubber sheet for thread rubber which is obtained by vulcanizing a raw rubber sheet for thread rubber using a pressure rotary drum type continuous vulcanizing device.

12 Claims, 1 Drawing Sheet

THREAD WOUND GOLF BALL AND PROCESS FOR PRODUCING THE SAME

FIELD OF THE INVENTION

The present invention relates to a golf ball. More particularly, it relates to a thread wound golf ball using a thread rubber obtained from a rubber sheet for thread rubber vulcanized by a continuous vulcanizing device.

BACKGROUND OF THE INVENTION

Thread rubber used for a thread wound golf ball has been generally produced by molding a raw rubber material into a sheet having a predetermined thickness, winding the raw rubber sheet around a drum having a certain size, vulcanizing using a vulcanizer and cutting the vulcanized rubber sheet into a suitable width. The thread wound golf ball is obtained by winding the thread rubber around a spherical center to form a thread rubber core and then covering it with a cover. In the vulcanization of the thread rubber using the vulcanizer, it is advantageous that a large amount of the thread rubber can be vulcanized at once. However, since the raw rubber sheet is wound around a drum having a predetermined size, the length of the sheet is decided by the amount winding around the drum. Therefore, in the step of winding the thread rubber around the center, a continuous thread winding can only be conducted until a length of the thread rubber winding around the drum has been used up, and the thread rubber always breaks while the thread is being wound.

Since the raw rubber sheet is wound around the drum one layer over another, the vulcanization in the vulcanizer is not uniformly conducted, sometimes, to form a difference in vulcanization degree between the outside and inside layers of the sheet wound around the drum. In the step of winding the thread rubber around the center, the thread rubber is wound around the center while applying a constant tension to the thread rubber and, therefore, the difference in vulcanization degree of the thread rubber leads to a difference in elongation of the thread rubber, thereby forming a difference in hardness of the resulting core, i.e. compression. Since scatter in ball compression produces scatter in flight distance, it is desired that scatter in ball compression is as small as possible. In addition, the requisite length of the thread rubber varies depending on the diameter of the center, and the remaining thread rubber which lacks in length is of no use.

OBJECTS OF THE INVENTION

A main object of the present invention is to mold a continuous thread rubber as long as possible, thereby providing a thread wound golf ball having high uniformity by using a rubber sheet for thread rubber wherein scatter in vulcanization degree is inhibited.

This object as well as other objects and advantages of the present invention will become apparent to those skilled in the art from the following description with reference to the accompanying drawing.

SUMMARY OF THE INVENTION

Figure 1:
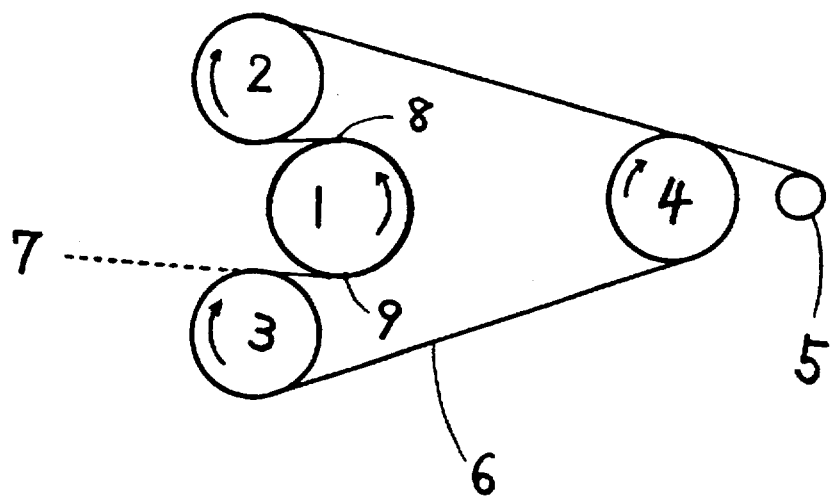
FIG. 1 is a schematic diagram illustrating a Rotocure type continuous vulcanizing device used in the present invention.

The present invention provides a thread wound golf ball comprising a center, a thread rubber layer formed by winding a thread rubber around the center and a cover formed on the thread rubber layer, wherein the thread rubber is obtained by cuffing, into a suitable width, a rubber sheet for thread rubber which is obtained by vulcanizing a raw rubber sheet for thread rubber using a pressure rotary drum type continuous vulcanizing device.

The present invention also provides a process for producing a thread wound golf ball comprising forming a thread wound center obtained by winding a thread rubber around a center and covering the thread wound center with a cover, wherein the thread rubber is obtained by cutting, into a suitable width, a rubber sheet for thread rubber which is obtained by vulcanizing a raw rubber sheet for thread rubber using a pressure rotary drum type continuous vulcanizing device.

DETAILED DESCRIPTION OF THE INVENTION

According to the present invention, a thread rubber is formed by using a rubber sheet for thread rubber produced by a pressure type rotary drum vulcanizing device so as to make it possible to mold a continuous thread rubber as long as possible, and to inhibit scatter in vulcanization degree and vulcanize multiple lengths for each requisite length corresponding to a plurality of center diameters. Thereby, a thread wound golf ball having high uniformity can be obtained.

The vulcanization using a continuous vulcanizing device does not require a step of winding a rubber sheet around a drum like the vulcanizer. Although the length of the raw rubber to be wound was limited by a conventional method, it is possible to vulcanize the raw rubber material having a requisite length continuously after molding it into a sheet and the length of the raw rubber is not limited. Therefore, the step can be simplified considerably in comparison with the vulcanization using the vulcanizer and, at the same time, a thread rubber having a length required for each golf ball can be obtained, thereby showing an advantage that raw material is effectively used without waste.

In the continuous vulcanization, the raw rubber sheet is uniformly vulcanized as it is without overlapping the raw rubber sheet. Therefore, the vulcanization degree of the resulting rubber is stable and it is possible to inhibit scatter in ball compression of the thread wound golf ball obtained from the above raw rubber sheet.

The continuous vulcanizing device is suitable for vulcanizing those having a continuous length, such as belt, etc. Examples of the devices are Rotocure type vulcanization (i.e. pressure rotary drum type vulcanization), electron ray irradiation vulcanization, heat medium bath vulcanization, etc. Among them, the pressure rotary drum type vulcanization is used in the present invention.

For example, the Rotocure type continuous vulcanizing device will be explained with reference to FIG. 1.

In FIG. 1, a main drum 1 is heated by steam, etc, and a raw rubber sheet is pressurized and heated by the main drum 1 and a steel belt 6, and then vulcanized between 8 and 9. The raw rubber sheet is supplied to a vulcanizing device from a numeral 7 in FIG. 1, and then wound up by a wind-up drum 5. The steel belt 6 moves between the respective drums by a driving drum 2, and the supplied raw rubber sheet moves on the steel belt 6 from the position supplied 7 to the wired-up drum 5 through the main drum 2, the driving drum 1. The numeral 3 in FIG. 1 is an auxiliary drum. Thus, the vulcanization is continuously conducted.

The vulcanization of the continuous vulcanization can be conducted at a temperature of 120° to 180° C. for 1 to 10 minutes. In the continuous vulcanizing device, the vulcanization time can be easily adjusted by changing the speed of the belt. The pressure applied to the raw rubber sheet at the time of vulcanization is about 1 to 10 kg/cm² (it is adjusted that the pressure of about 100 to 200 kg/cm² is applied to the drum 4). The resulting thread rubber sheet has a thickness of 0.3 to 1.0 mm, preferably 0.4 to 0.6 mm, and a thread rubber for golf ball can be obtained by cutting the above thread rubber into a width of 0.5 to 3.0 mm, preferably 1.0 to 2.0 mm.

As the raw rubber sheet for thread rubber, those having a normal composition are used. For example, there can be suitably those prepared by formulating 1 to 5 parts by weight of sulfur, 0.1 to 2 parts by weight of zinc oxide, 0.3 to 3 parts by weight of an antioxidant and 0.1 to 2 parts by weight of a vulcanization accelerator (filler may also be formulated) for 100 parts by weight of a natural or a synthetic isoprene rubber.

In the present invention, a desired thread wound golf ball is obtained by winding the above thread rubber around a center obtained by a conventional method to form a thread wound center, and covering it with a cover material containing an ionomer resin or balata (transpolyisoprene) as a main component. The cover may be formed by forming a half-shell of the cover material and then molding in a mold provided with dimples, or directly formed by inject molding of the cover material.

Regarding the vulcanization of the thread rubber using the continuous vulcanizing device, the step thereof can be considerably simplified in comparison with a conventional method because the raw rubber material is vulcanized as it is, continuously, after molding into a sheet. In addition, a thread rubber having a considerably continuous length can be produced and, therefore, a number of breakage of the thread in the thread winding step can be reduced, thereby improving the workability drastically. In addition, when the thread is broken in the thread winding step, the thread is wound again from the state where the thread is broken, thereby forming scatter in ball compression. Therefore, it is extremely effective to inhibit this scatter.

EXAMPLES

The following Examples and Comparative Examples further illustrate the present invention in detail but are not to be construed to limit the scope thereof.

Example 1 and Comparative Example 1

After a raw rubber material was molded into a sheet, a thread wound golf ball using a thread rubber vulcanized by a Rotocure type continuous vulcanizing device (Example 1) and that using a thread rubber vulcanized by a conventional vulcanizer (Comparative Example 1) were produced. The range and scatter of the ball compression etc. of the respective thread wound golf balls are shown in Table 1.

TABLE 1

| Vulcanizing method | Rotocure type (continuous vulcanization) | Vulcanizer | Electron ray Irradiation (continuous vulcanization) | Heating medium bath (continuous vulcanization) |
|---|---|---|---|---|
| Physical properties of thread rubber | No problem | No problem | Impossible to put to practical use* | Impossible to put to practical use** |
| Range of scatter in ball compression*** | 2.40–2.46 | 2.33–2.55 | — | — |
| Range of scatter in flight performance | | | | |
| Ball velocity (m/second) | 62.94–63.28 | 62.75–63.53 | — | — |
| Spin amount (rpm) | 2955–3057 | 2887–3142 | — | — |
| Carry (yard) | 226–229 | 224–232 | — | — |

*: It is because the vulcanization construction thereof is different from that of the heat curing, and a hysteresis loss of the thread rubber is large.
**: It is because the degree of pressurizing is low to cause foaming easily and, further, it is exposed to air to cause heat deterioration easily.
***: It is the amount of strain (mm) formed by applying a load of 130 kg to the golf ball.

As shown in Table 1, according to the Rotocure type continuous vulcanizing method, scatter in ball compression becomes considerably small in comparison with a conventional vulcanizing method. As is apparent from scatter in flight performance, scatter becomes small in ball velocity, spin amount and carry.

(Vulcanizing conditions)

| Vulcanizing method | Rotocure type | Vulcanizer |
|---|---|---|
| Vulcanizing temperature | 150° C. | 128° C. |
| Vulcanizing time | 3 min., 43 sec. | 150 min. |
| Pressure | 150 kg/cm²*¹ | 1.6 kg/cm²*² |

*¹: pressure applied on drum 4
*²: pressure in interior of vulcanizer (Measuring method)

A range of scatter in ball compression and that of scatter in flight performance (due to a wood club No. 1, head speed: 45 m/second) of two kinds of golf balls produced (each 100 golf balls) by using each thread rubber vulcanized by each vulcanizing method in the thread winding step at the same tension were measured.

The measured value of the ball compression is represented by the amount of strain (mm) formed by applying a load of 130 kg to the golf ball.

What is claimed is:

1. A thread wound golf ball comprising a center, a thread rubber layer formed by winding a thread rubber around the center and a cover formed on the thread rubber layer, wherein the thread rubber is obtained by cutting, into a suitable width, a rubber sheet for thread rubber which is obtained by vulcanizing a raw rubber sheet for thread rubber using a pressure rotary drum type continuous vulcanizing device, wherein the vulcanization is conducted at a temperature of 120° to 180° C. for 1 to 10 minutes at a pressure of 1 to 10 Kg/cm², and wherein the vulcanized rubber sheet for thread rubber has a thickness of 0.3 to 1.0 mm.

2. The thread wound golf ball according to claim 1 wherein the vulcanized rubber sheet for thread rubber is cut into a width of 0.5 to 3.0 mm.

3. The thread wound golf ball according to claim 1 wherein the raw rubber sheet for thread rubber is prepared from a rubber composition which comprises 100 parts by weight of natural rubber or synthetic isoprene rubber, 1 to 5 parts by weight of sulfur, 0.1 to 2 parts by weight of zinc oxide, 0.3 to 3 parts by weight of an antioxidant and 0.1 to 2 parts by weight of a vuicanization accelerator.

4. The thread wound golf ball according to claim 1 wherein said cover is made from ionomer resin or balata.

5. The thread wound golf ball according to claim 1 wherein the vulcanized rubber sheet for thread rubber has a thickness of 0.4 to 0.6 mm.

6. The thread wound golf ball according to claim 1 wherein the vulcanized rubber sheet for thread rubber is cut into a width of 1.0 to 2.0 mm.

7. A process for producing a thread wound golf ball comprising forming a thread wound center obtained by winding a thread rubber around a center and covering the thread wound center with a cover, wherein the thread rubber is obtained by cutting, into a suitable width, a rubber sheet for thread rubber which is obtained by vulcanizing a raw rubber sheet for thread rubber using a pressure rotary drum type continuous vulcanizing device, wherein the vulcanization is conducted at a temperature of 120° to 180° C. for 1 to 10 minutes at a pressure of 1 to 10 Kg/cm², and wherein the vulcanized rubber sheet for thread rubber has a thickness of 0.3 to 1.0 mm.

8. The process according to claim 7 wherein the vulcanized rubber sheet for thread rubber is cut into a width of 0.5 to 3.0 mm.

9. The process according to claim 7 wherein the raw rubber sheet for thread rubber is prepared from a rubber composition which comprises 100 parts by weight of natural rubber or synthetic isoprene rubber, 1 to 5 parts by weight of sulfur, 0.1 to 2 parts by weight of zinc oxide, 0.3 to 3 parts by weight of an andoxidant and 0.1 to 2 parts by weight of a vulcanization accelerator.

10. The thread wound golf ball according to claim 7 wherein said cover is made from ionomer resin or balata.

11. The process according to claim 7 wherein the vulcanized rubber sheet for thread rubber has a thickness of 0.4 to 0.6 mm.

12. The process according to claim 7 wherein the vulcanized rubber sheet for thread rubber is cut into a width of 1.0 to 2.0 mm.

* * * * *